(12) United States Patent
Kurakake et al.

(10) Patent No.: US 8,210,901 B2
(45) Date of Patent: Jul. 3, 2012

(54) METHOD FOR PRODUCING CERAMIC-HONEYCOMB-STRUCTURE-MOLDING DIE AND METHOD FOR PRODUCING CERAMIC HONEYCOMB STRUCTURE

(75) Inventors: Kazuyuki Kurakake, Moka (JP); Tomohisa Ogata, Moka (JP); Hiroshi Inoue, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 572 days.

(21) Appl. No.: 12/440,341

(22) PCT Filed: Oct. 29, 2007

(86) PCT No.: PCT/JP2007/071059
§ 371 (c)(1),
(2), (4) Date: Apr. 7, 2009

(87) PCT Pub. No.: WO2008/050888
PCT Pub. Date: May 2, 2008

(65) Prior Publication Data
US 2010/0044910 A1    Feb. 25, 2010

(30) Foreign Application Priority Data
Oct. 27, 2006 (JP) .................................. 2006-293172

(51) Int. Cl.
*B24B 1/00* (2006.01)
(52) U.S. Cl. ................ 451/28; 451/41; 451/57; 451/63; 451/69
(58) Field of Classification Search .................. 451/41, 451/63, 28, 57, 69; 83/51, 875; 29/557, 29/558
See application file for complete search history.

(56) References Cited

U.S. PATENT DOCUMENTS

| 5,728,286 | A | * | 3/1998 | Suzuki et al. | ................. 205/640 |
| 6,732,621 | B2 | * | 5/2004 | Iwata et al. | ....................... 83/51 |
| 2001/0045366 | A1 | | 11/2001 | Iwata et al. | |
| 2008/0168866 | A1 | * | 7/2008 | Baba | ........................... 76/107.1 |
| 2008/0196237 | A1 | * | 8/2008 | Shinya et al. | ................... 29/557 |

FOREIGN PATENT DOCUMENTS

| JP | 01-237102 A | 9/1989 |
| JP | 04-030558 A | 2/1992 |
| JP | 11-058407 A | 3/1999 |
| JP | 11-070510 A | 3/1999 |
| JP | 2005-223130 A | 8/2005 |
| JP | 2006-041261 A | 2/2006 |

OTHER PUBLICATIONS

European Search Report in corresponding Application No. EP 07 83 0793 dated Oct. 14, 2009.

* cited by examiner

*Primary Examiner* — George Nguyen
(74) *Attorney, Agent, or Firm* — Sughrue Mion, PLLC

(57) ABSTRACT

A method for producing a die for molding a ceramic honeycomb structure, which has molding grooves arranged in a lattice pattern and apertures communicating with the molding grooves for supplying a moldable material, wherein the formation of the lattice-patterned grooves by machining is conducted by a first machining operation for forming pluralities of first parallel grooves, and a second machining operation for forming second grooves crossing the first grooves; wherein the first and second machining operations are conducted by at least 2 passes of grinding or cutting using a rotating tool; and wherein the second machining operation is conducted by up-cutting in the second pass or later, and a method for producing a ceramic honeycomb structure using such a die.

2 Claims, 4 Drawing Sheets

PRIOR ART

PRIOR ART

METHOD FOR PRODUCING CERAMIC-HONEYCOMB-STRUCTURE-MOLDING DIE AND METHOD FOR PRODUCING CERAMIC HONEYCOMB STRUCTURE

CROSS REFERENCE TO RELATED APPLICATION

This application is a National Stage of International Application No. PCT/JP2007/071059 filed Oct. 29, 2007, claiming priority based on Japanese Patent Application No. 2006-293172, filed Oct. 27, 2006, the contents of all of which are incorporated herein by reference in their entirety.

FIELD OF THE INVENTION

The present invention relates to a method for producing a die used for the extrusion molding of a ceramic honeycomb structure, and a method for producing a ceramic honeycomb structure.

BACKGROUND OF THE INVENTION

A ceramic honeycomb structure (simply called "honeycomb structure" below) used as a filter for cleaning an exhaust gas, etc. is produced by extruding a moldable ceramic material through a honeycomb-structure-molding die (simply called "molding die") to form a honeycomb molding, and drying and sintering it. As shown in FIGS. 2(a) and 2(b), the molding die 10 is formed from a die-forming work 11 having such a shape that a groove-having surface 21 projects, that moldable-material-supplying apertures 30 are formed in the die-forming work 11 such that they extend from an aperture-having surface 31, and that lattice-patterned grooves 20 are formed on a groove-having surface 21. As shown in FIG. 3, the moldable-material-supplying apertures 30 of the molding die 10 are communicating with the molding grooves 20. A moldable ceramic material introduced into the molding die 10 through the apertures 30 are formed into a honeycomb shape by the grooves 20 to provide a honeycomb molding.

The molding die 10 is produced by forming apertures 30 by drilling, etc. in the die-forming work 11 having a projecting groove-having surface 21 as shown in FIG. 4(a) from its aperture-having surface 31 (on the opposite side of the groove-having surface 21), and then forming the grooves 20 on the groove-having surface 21. The lattice-patterned grooves 20 are produced by forming pluralities of first parallel grooves 20a by grinding or cutting by a rotating tool 40 (first machining operation) as shown in FIG. 4(b), rotating the die-forming work 11 by 90°, and then forming pluralities of second parallel grooves 20b crossing the previously machined grooves 20a (second machining operation) as shown in FIG. 4(c).

When a narrow, deep grooves 20 are formed by a rotating thin tool 40, the tool 40 is likely deformed or warped by large machining resistance, resulting in meandering grooves and damaging of the tool 40.

Accordingly, grooves 20 having large depth relative to width are usually formed by 2 or more passes. Namely, first-pass machining is conducted to form a groove 22 having depth $L_1$ as shown in FIG. 6(a), and second-pass machining is conducted to form a groove 20 having depth L, which is deeper than the groove 22, as shown in FIG. 6(b).

Conventional machining of grooves 20 is conducted by so-called down-cutting, in which the tool 40 is rotated in the direction shown in FIG. 4(b). If machining were conducted with the rotation direction of the tool 40 reversed from that shown in FIG. 4(b), namely by up-cutting, a force in a direction of lifting the die-forming work 11 is likely to cause micro-vibration, so-called chatter vibration, in the die 10. This phenomenon tends to occur particularly in the case of large cutting depth. The chatter vibration deteriorates the precision of width and depth of the grooves 20, and damages the tool 40.

In the case of machining by down-cutting, when grooves 22 are formed crossing the already machined grooves 20 (first pass), burrs 50 are generated at intersections 23 of the grooves 20 and the grooves 22 as shown in FIG. 6(a). When a rotating tool 40 passes the intersections 23 in the second-pass machining as shown in FIG. 6(b), the burrs 50 are entrained into gaps between the rotating tool 40 and the die-forming work 11, so that the tool 40 is broken or warped. When the tool 40 is broken, its fragments scratch the grooves. Also, the warped tool 40 provides the grooves 20 with partially enlarged width.

JP 11-70510 A discloses a method for producing a die for molding a honeycomb structure having pluralities of apertures for supplying a moldable material, and slit grooves communicating with the apertures and arranged in a lattice pattern to form a honeycomb molding, each slit groove having depth 10 times or more its width, the machining of the above slit grooves being conducted by grinding or cutting a die-forming work with a rotating tool having a thickness of 150 μm or less, and the order of machining pluralities of parallel slit grooves in the same direction being such a random order that the change of the groove width by the machining order does not affect the moldability of the honeycomb structure. It is described that this method prevents the breakage of a tool while suppressing width variation of the slit grooves.

Although the method of JP 11-70510 A is effective to some extent to prevent the meandering of grooves and damage to the tool, a sufficient effect cannot be obtained particularly when the tool has a reduced cutting performance due to wear, failing to solve these problems completely. As a result, the tool is likely broken during machining, its fragments scratching grooves, and when the tool is warped if not broken the groove width partially expands, causing irreparable damage. If the die had scratch or partially enlarged width in a groove even at only one point, an extrusion-molded honeycomb structure would suffer defects such as deformation, breakage, etc. in its cell walls, making the die unusable.

The above problems make the production cost of a molding die higher, posing a large obstacle to the reduction of the production cost of a honeycomb structure. Accordingly, a further improvement is needed.

OBJECT OF THE INVENTION

Accordingly, an object of the present invention is to provide a method for producing a molding die while preventing the breakage and warpage of a rotating tool during forming grooves, so that the grooves do not suffer scratching and partial width expansion, and a method for producing a honeycomb structure without deformation and breakage.

DISCLOSURE OF THE INVENTION

As a result of intensive research in view of the above object, the inventors have found that when a rotating tool progresses crossing the already machined grooves, machining by up-cutting remarkably suppresses scratches and width expansion from occurring in the resultant grooves. The present invention has been completed based on such finding.

Thus, the method of the present invention for producing a die for molding a ceramic honeycomb structure, which comprises molding grooves arranged in a lattice pattern, and apertures communicating with the molding grooves for supplying a moldable material, comprises forming the lattice-patterned grooves by machining by a first machining operation for forming pluralities of first parallel grooves, and a second machining operation for forming second grooves crossing the first grooves; conducting the first and second machining operations by at least 2 passes of grinding or cutting using a rotating tool; and conducting the second machining operation by up-cutting in the second pass or later.

A first pass in the second machining is preferably conducted by down-cutting. Said first machining is preferably conducted by down-cutting.

The method of the present invention for molding a ceramic honeycomb structure uses a die having molding grooves arranged in a lattice pattern and apertures communicating with the molding grooves for supplying a moldable material, the lattice-patterned molding grooves being formed by a first machining operation for forming pluralities of first parallel grooves, and a second machining operation for forming second grooves crossing the first grooves; the first and second machining operations being conducted by at least 2 passes of grinding or cutting using a rotating tool; and the second machining operation being conducted by up-cutting in the second pass or later.

DESCRIPTION OF THE PREFERRED EMBODIMENTS

Figure 1:
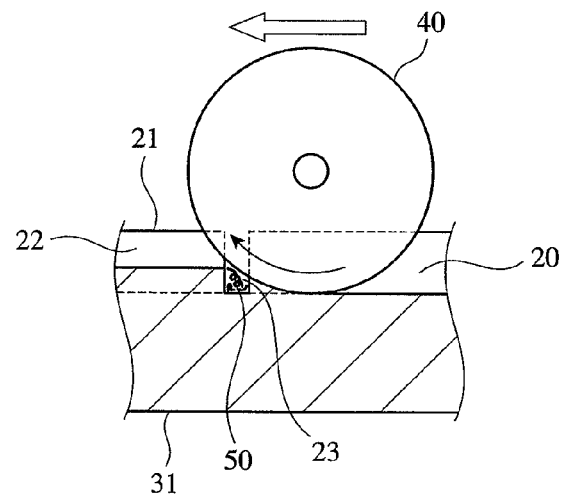
FIG. 1 is a schematic view showing the method of the present invention for producing a molding die.
Figure 2A:
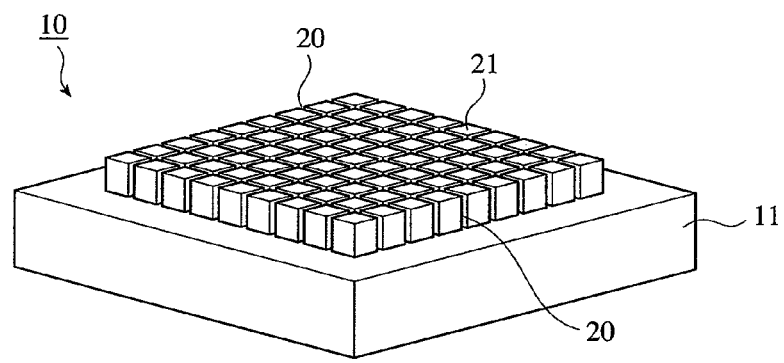
FIG. 2(a) is a perspective view showing one example of the molding dies.
Figure 2B:
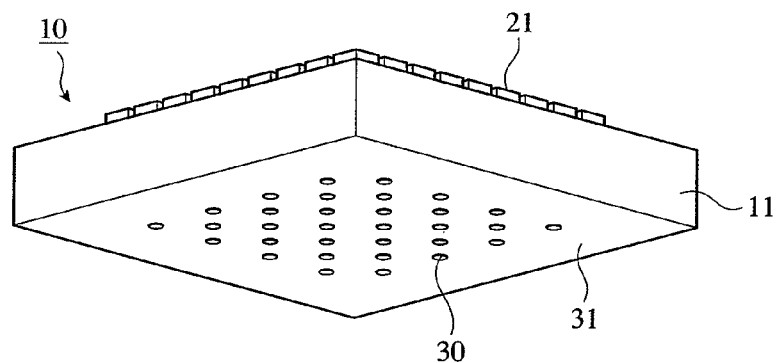
FIG. 2(b) is a perspective view showing another example of the molding dies.
Figure 6A:
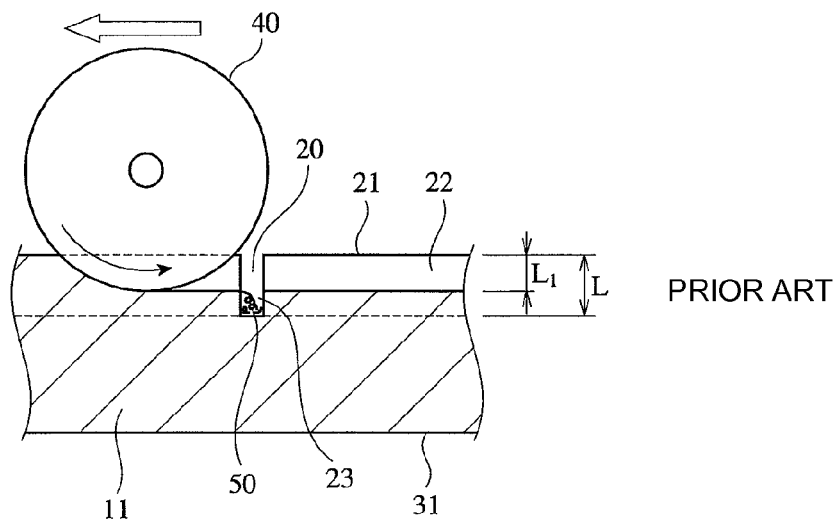
FIG. 6(a) is a schematic view showing troubles occurring when machining a conventional molding die to form grooves.
Figure 6B:
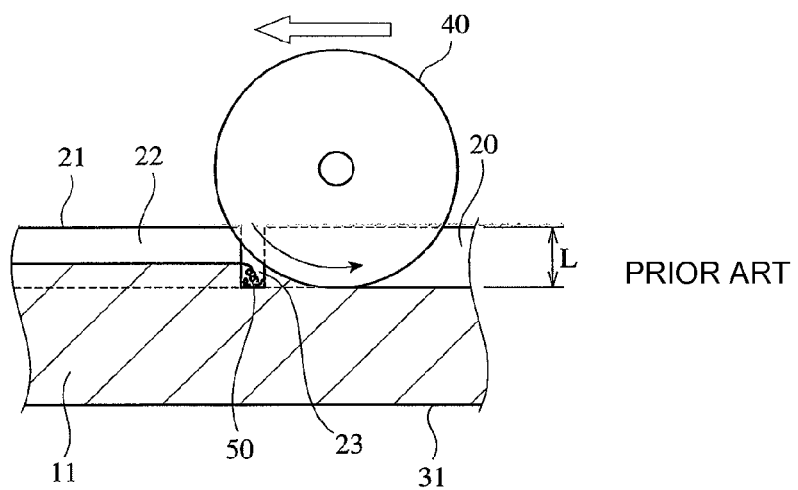
FIG. 6(b) is a schematic view showing other troubles occurring when machining a conventional molding die to form grooves.

In the present invention, as shown in FIG. 1, in the second machining in which the rotating tool 40 progresses crossing the already machined grooves (first molding grooves), the tool 40 rotates in an opposite direction to the rotation direction shown in FIG. 6(b) to conduct so-called "up-cutting." Such up-cutting can send burrs 50 generated at intersections 23 into partially machined first-pass grooves 22, thereby preventing the burrs 50 from intruding between the rotating tool 40 and the die-forming work 11. Accordingly, the tool 40 is not broken or warped during machining the grooves 20, so that the resultant grooves are free from scratches and partially enlarged width.

When a honeycomb structure is produced by a die with molding grooves up-cut as described above, its cell walls are free from deformation and breakage. To prevent chatter vibration during up-cutting the grooves, the cutting depth per one pass is preferably as small as possible. Specifically, the cutting depth is preferably 10 times or less, more preferably 8.5 times or less, the width of the grooves.

Figure 5:
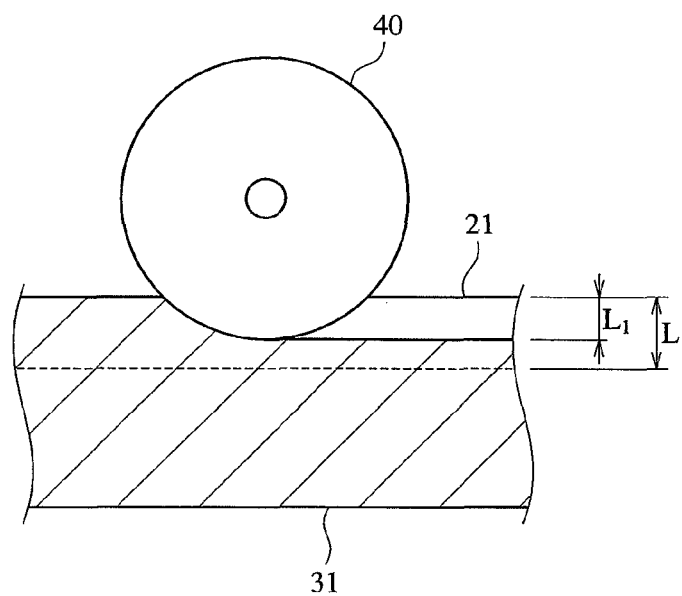
FIG. 5 is a schematic view showing the formation of a groove in a die by machining.

To have as small cutting depth as described above, the molding groove 20 is machined by at least 2 passes. Namely, as shown in FIG. 5, the first machining (one pass) is conducted with cutting depth $L_1$ smaller than the target depth L of the groove 20, and the rotating tool 40 progresses again on the same groove to machine the groove 20 deeper. Machining to the target depth L is preferably conducted by two passes, but machining by 3 passes or more may be conducted if necessary. Particularly when a die for molding a honeycomb structure having as large a diameter as 200 mm or more is produced by up-cutting, chatter vibration is effectively prevented by machining by 2 passes or more.

The first-pass machining of the grooves is preferably conducted by down-cutting, to suppress chatter vibration and the intrusion of burrs. Even if chatter vibration occurred in the die 10 during up-cutting with the cutting depth of 4 mm, for instance, chatter vibration would not occur in the case of down-cutting. Cutting can be deeper in down-cutting than in up-cutting. However, attention should be paid to the fact that too large cutting depth provides large machining resistance even in the case of down-cutting, making it likely that the tool is warped or broken. Accordingly, the first-pass machining of the grooves is conducted by down-cutting to provide deeper cutting than when it is conducted by up-cutting, thereby reducing the number of machining steps.

Machining (first machining) not crossing the grooves is preferably conducted by down-cutting. In the case of the first machining in which parallel grooves are formed without crossing the already machined grooves as shown in FIG. 4(b), burrs 50 are not generated because there were no intersections 23. Accordingly, even if the second-pass machining were conducted by down-cutting, there would be no likelihood that burrs 50 intrude between the rotating tool 40 and the die-forming work 11. Thus, it is preferably conducted by down-cutting generating no chatter vibration.

As described above, machining by up-cutting is preferably conducted in the second machining, in which a rotating tool progresses crossing the already machined grooves. Further, the second-pass machining in the second machining should be conducted by up-cutting. In the present invention, the progress of the rotating tool means that the rotating tool 40 moves relative to the die-forming work 11; the rotating tool 40 may move while the die-forming work 11 is stationary, or the die-forming work 11 may move while the rotating tool 40 is stationary.

The present invention will be explained in further detail by Examples below without intention of restricting the present invention thereto.

Example 1

(1) Formation of Moldable-Material-Supplying Apertures

Figure 3:
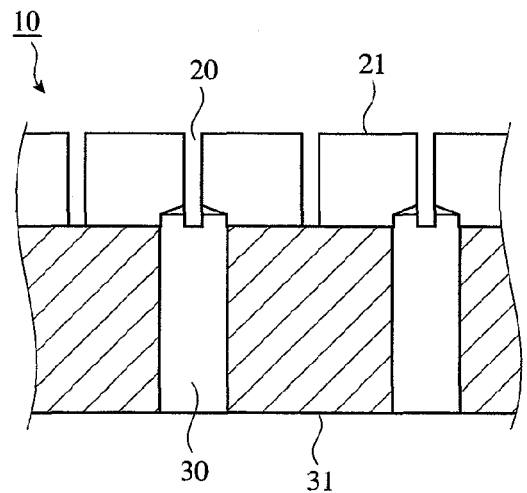
FIG. 3 is a cross-sectional view showing one example of the molding dies.
Figure 4A:
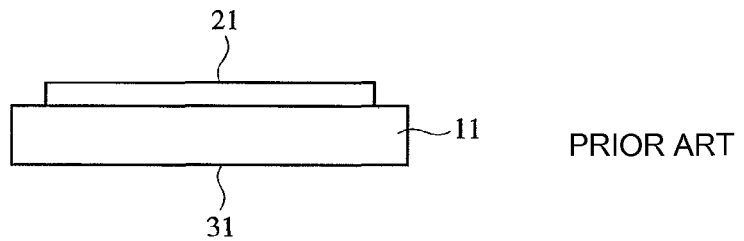
FIG. 4(a) is a schematic view showing a work for a conventional molding die.
Figure 4B:
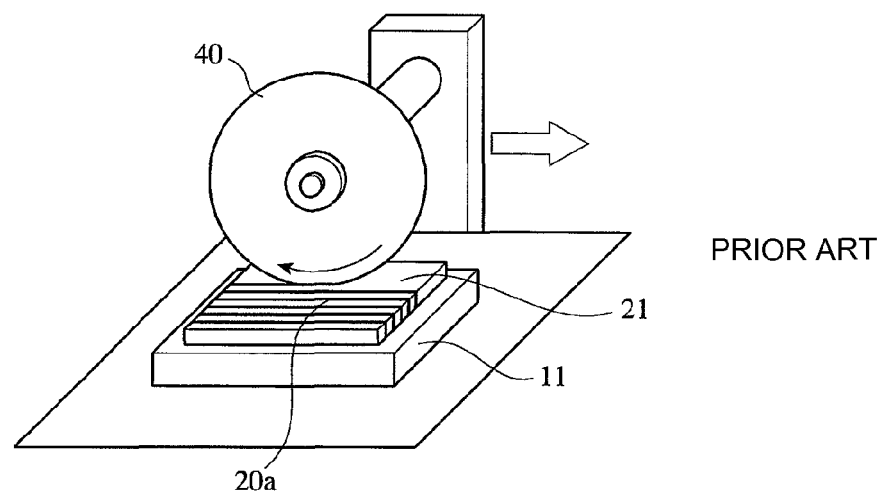
FIG. 4(b) is a schematic view showing a first machining operation for producing a conventional molding die.
Figure 4C:
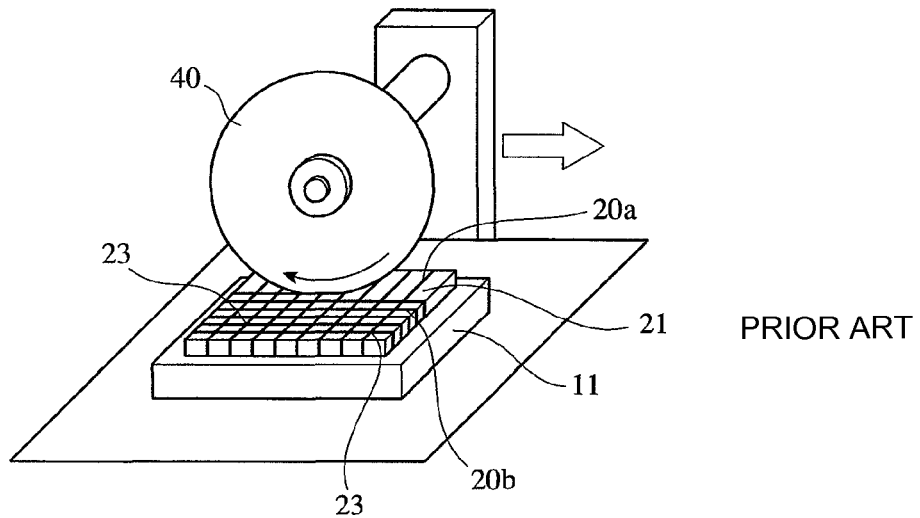
FIG. 4(c) is a schematic view showing a second machining operation for producing a conventional molding die.

Prepared was a die-forming work 11 made of alloy tool steel (JIS G4404), which had a projected groove-having surface 21 of 240 mm×240 mm, and a surface 31 of 260 mm×260 mm from which apertures were formed, as shown in FIG. 4(a). The die-forming work 11 was drilled with a cemented carbide drill having a diameter of 1.1 mm and a tip angle of 140° from the aperture-machining surface 31 to form apertures 30 as shown in FIG. 3.

(2) Formation of First Grooves

The groove-having surface 21 was machined by a rotating tool 40 to form grooves 20. The tool 40 was a thin grinder disc having a thickness of 0.25 mm and a diameter of 100 mm. First, parallel grooves 20 as deep as 4 mm were formed by down-cutting (first pass). The second-pass machining was then conducted by up-cutting, such that the previously machined grooves 20 became 2.5 mm deeper, namely the depth of the machined grooves 20 became 6.5 mm. The diameter of the tool 40 decreased by wear as the machining time went, and when its diameter became smaller than the predetermined level, the tool 40 was exchange to new one for further machining. The above machining formed 159 parallel grooves 20 of 6.5 mm in depth and 0.26 mm in width with a pitch of 1.5 mm.

(3) Formation of Second Grooves

The second grooves 20 perpendicular to the first grooves when viewed on the groove-having surface 21 were formed by two passes like the first grooves. Namely, 4-mm-deep grooves 20 were formed by down-cutting using a thin grinder disc having a thickness of 0.25 mm and a diameter of 100 mm (first pass), and the second-pass machining was conducted by up-cutting to form 159 parallel second grooves 20 of 6.5 mm in depth and 0.26 mm in width with a pitch of 1.5 mm.

A molding die 10 thus obtained had apertures 30 extending from the aperture-machining surface 31 of the die-forming work 11, and grooves 20 crossing in a lattice pattern on the groove-having surface 21.

In this Example, the observation of the die 10 at the time of completing the first-pass machining of the second grooves crossing the already formed first grooves revealed that although there were large numbers of burrs 50 at intersections 23 of the first and second grooves 20, the tool 40 was not broken when the second-pass machining was finished. Further, there were neither scratches nor partially enlarged width in the grooves.

A cordierite-based honeycomb structure obtained by drying and sintering a honeycomb molding extruded by a known method through a die produced in this Example did not suffer breakage and deformation which would cause practical problems.

Comparative Example 1

A molding die 10 was produced in the same manner as in Example 1, except for changing up-cutting to down-cutting in the second-pass machining of the first and second grooves 20. The observation of the die 10 revealed that there were large numbers of burrs 50 at intersections 23 of the grooves 20 at the time of completing the first-pass machining of the second grooves crossing the already formed first grooves, and that the burrs 50 were entrained by the rotating tool during the second-pass machining of the second grooves, so that the tool 40 was broken.

Comparative Example 2

A molding die 10 was produced in the same manner as in Example 1, except that 6.5-mm-deep, first and second grooves 20 were formed by down-cutting and by only one pass. The observation of the die 10 at the time of completing the formation of grooves 20 crossing in a lattice pattern revealed that the grooves were partially expanded presumably because of the warpage of the tool 40.

EFFECT OF THE INVENTION

Preventing the breakage and warpage of a rotating tool during forming grooves without providing grooves with scratches and partial width expansion, the present invention can provide a honeycomb structure free from deformation and breakage.

What is claimed is:

1. A method for producing a die for molding a ceramic honeycomb structure, which comprises molding grooves arranged in a lattice pattern, and apertures communicating with said molding grooves for supplying a moldable material, wherein the formation of said lattice-patterned grooves by machining is conducted by a first machining operation for forming pluralities of first parallel grooves, and a second machining operation for forming second grooves crossing said first grooves; wherein said first and second machining operations are conducted by at least 2 passes of grinding or cutting using a rotating tool; wherein said first machining operation is conducted by down-cutting; wherein said second machining operation is conducted by down cutting in the first pass and up-cutting in the second pass or later; and wherein said molding grooves have a depth of 10 times or more of its width.

2. A method for molding a ceramic honeycomb structure using a die having molding grooves arranged in a lattice pattern and apertures communicating with said molding grooves for supplying a moldable material, wherein said lattice-patterned molding grooves are formed by a first machining operation for forming pluralities of first parallel grooves, and a second machining operation for forming second grooves crossing said first grooves; wherein said first and second machining operations are conducted by at least 2 passes of grinding or cutting using a rotating tool; wherein said first machining operation is conducted by down-cutting; wherein said second machining operation is conducted by down cutting in the first pass and up-cutting in the second pass or later; and wherein said molding grooves have a depth of 10 times or more of its width.

* * * * *